(12) United States Patent
Ishitani (10) Patent No.: US 7,940,360 B2
(45) Date of Patent: May 10, 2011

(54) LIQUID CRYSTAL DISPLAY DEVICE

(75) Inventor: Tetsuji Ishitani, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/699,925

(22) Filed: Feb. 4, 2010

(65) Prior Publication Data

US 2010/0134748 A1   Jun. 3, 2010

Related U.S. Application Data

(63) Continuation of application No. 11/276,156, filed on Feb. 16, 2006, now Pat. No. 7,683,993.

(30) Foreign Application Priority Data

Feb. 25, 2005  (JP) .................................. 2005-050557

(51) Int. Cl.
 *G02F 1/1333* (2006.01)
 *G02F 1/1339* (2006.01)
 *G02F 1/1343* (2006.01)
(52) U.S. Cl. ......... 349/139; 349/122; 349/153; 349/156
(58) Field of Classification Search .................. 349/139, 349/122, 153, 156
See application file for complete search history.

(56) References Cited

U.S. PATENT DOCUMENTS

| | | | |
|---|---|---|---|
| 5,982,471 A | 11/1999 | Hirakata et al. | |
| 6,177,974 B1 | 1/2001 | Hirakata et al. | |
| 6,236,444 B1 | 5/2001 | Konuma et al. | |
| 6,404,480 B2 | 6/2002 | Hirakata et al. | |
| 6,636,192 B1 * | 10/2003 | Saitoh .............................. | 345/87 |
| 6,980,275 B1 | 12/2005 | Konuma et al. | |
| 7,068,339 B2 | 6/2006 | Nakamura et al. | |
| 2004/0125299 A1 * | 7/2004 | Nakamura et al. ............ | 349/139 |

FOREIGN PATENT DOCUMENTS

| | | |
|---|---|---|
| CN | 1293802 A | 5/2001 |
| CN | 1508609 A | 6/2004 |
| JP | 06273777 A | 9/1994 |

OTHER PUBLICATIONS

Office Action (Chinese Application No. 200610051441.X) mailed Sep. 19, 2008 with English translation.

* cited by examiner

*Primary Examiner* — Mark A Robinson
*Assistant Examiner* — Jerry Blevins
(74) *Attorney, Agent, or Firm* — Fish & Richardson P.C.

(57) ABSTRACT

The present invention easily provides a liquid crystal display in which conductivity between a first substrate over which a pixel electrode is formed and a second substrate over which a counter electrode is formed, can be certainly obtained even when it has a narrow frame, without adding new steps. As for a liquid crystal display device in which a liquid crystal is interposed between the first substrate over which the pixel electrode is formed and the second substrate over which the counter electrode is formed, when the first and second substrates are positioned so that the pixel electrode and the counter electrode are on the inside, and are attached to each other with a sealant, by providing a partition wall between the sealant and a conductive portion formed with a conductor to electrically connect the pixel electrode to the counter electrode, conductivity in a conductive portion can be certainly obtained.

35 Claims, 6 Drawing Sheets

LIQUID CRYSTAL DISPLAY DEVICE

CROSS-REFERENCE TO RELATED APPLICATIONS

This application is a continuation of U.S. application Ser. No. 11/276,156, filed Feb. 16, 2006, now allowed, which claims the benefit of a foreign priority application filed in Japan as Serial No. 2005-050557 on Feb. 25, 2005, both of which are incorporated by reference.

BACKGROUND OF THE INVENTION

1. Field of the Invention

The present invention relates to a liquid crystal display device. Further, the present invention relates to a technology to increase quality of a liquid crystal display device.

2. Description of the Related Art

In recent years, demand for a liquid crystal display device as a flat panel display has grown since the liquid crystal display device has advantages of thinness, lightweight and being capable of low-power-consumption driving. The liquid crystal display has various modes, and a liquid crystal display using a nematic liquid crystal includes a twisted nematic (TN) mode, a vertical alignment (VA) mode, an in plane switching (IPS) mode, an optically compensated bend (OCB) mode and the like. Further, a ferroelectric liquid crystal mode and an antiferroelectric liquid crystal mode in which a response speed is faster than in a nematic liquid crystal, are also proposed. In addition, polymer dispersed liquid crystal (PDLC) mode in which a liquid crystal is dispersed in a polymer molecule is also proposed.

Many other modes are proposed. However, a phenomenon that a liquid crystal transmits and does not transmit light in a liquid crystal display is basically performed by controlling birefringence, optical rotation, or scattering of the liquid crystal by applying voltage to the liquid crystal.

As a driving method for a liquid crystal display device, two kinds which are a passive driving method and an active matrix driving method are given. When a liquid crystal mode such as the TN mode, the VA mode or the OCB mode which is driven by applying voltage between upper and lower substrates, is operated in active matrix driving, voltage is applied through a flexible print circuit (FPC) which is attached to an active matrix substrate; therefore, in order to generate potential difference between the upper and lower substrates, a conductive portion (common contact portion) which makes a counter electrode of a counter substrate conductive to a connection wiring of the active matrix substrate, is required.

Generally, a method for forming the conductive portion is as follows: A sealant in which a conductor is mixed is applied to the conductive portion of either the upper substrate or the lower substrate, the upper and lower substrates are attached to each other, and the conductor which is formed at the conductive portion is in contact with the upper and lower substrates; therefore conductivity can be obtained.

However, in a case where the conductive portion is close to an insulating sealant for sealing the liquid crystal, in other words, in a case of a narrow frame, the conductive portion is covered by the sealant when the upper and lower substrates are attached to each other, and a conductive material cannot be in contact with both the upper and lower substrates or one side of the substrate; therefore a defect that conductivity cannot be obtained is occurred.

For this, a groove is formed at one of a pair of the substrates so that the above-described sealant which can cover the conductive portion goes into the groove (for example, refer to Patent Document 1)

However, in a case of using the above method, it is necessary to form a groove at one of the substrates by using laser and the like in advance, and the method has a problem that new steps are added, and the like.

Patent Document

Japanese Patent Laid-Open No. H6-273777

SUMMARY OF THE INVENTION

In view of the objects as described above, it is an object of the present invention to easily provide a liquid crystal display in which conductivity can be certainly obtained in a conductive portion even in a case of a narrow frame, without adding new steps.

In order to solve the above problems, in an aspect of a liquid crystal display device in which a liquid crystal is interposed between a first substrate over which a pixel electrode and a connection wiring are formed and a second substrate over which a counter electrode is formed, when the first and second substrates are positioned so that the pixel electrode and the counter electrode are on the inside, and are attached to each other with a sealant, a partition wall is provided between a position where the sealant is formed and a position where a conductive portion formed from a conductor is formed in order to electrically connect the connection wiring to the counter electrode.

In an aspect of the present invention, a liquid crystal display device in which a liquid crystal material is interposed between first and second substrates, has a pixel electrode formed over the first substrate; a connection wiring formed over the first substrate; and a counter electrode formed over the second substrate, wherein the first and second substrates are positioned so that the pixel electrode and the counter electrode are on the inside, and are attached to each other with a sealant provided around the first and second substrates; a conductor which electrically connects the connection wiring to the counter electrode in an interior portion of the sealant, wherein a partition wall is provided between the sealant and the conductor.

In another aspect of the present invention, a liquid crystal display device has a pixel electrode formed over a first substrate; a connection wiring formed over the first substrate; a driver circuit formed over the first substrate; a conductor formed over the first substrate; a partition wall formed over the first substrate; a counter electrode formed over a second substrate; a color filter formed on the second substrate; and a pillar spacer formed over the second substrate, wherein the first and second substrates are positioned so that the pixel electrode and the counter electrode are on the inside, and are attached to each other with a sealant provided around the first and second substrates; wherein the conductor is provided in an interior portion of the sealant and electrically connects the connection wiring to the counter electrode; and wherein the partition wall is provided between the sealant and the conductor. Note that the partition wall is not limited to over the first substrate, and one or a plurality of partition walls can be formed over the second substrate or both the first and second substrates.

In addition, the partition wall which is formed over the first substrate or the second substrate in the present invention is characterized by being positioned around the conductor in a circular, elliptical, triangle, quadrangular or polygonal form as seen from the substrate side. Note that the partition wall may be in contact with the conductor, and also may have a space with the conductor. In a case where there is a space between the partition wall and the conductor, by reducing the pressure in the space and generating pressure difference between the inside of the space and the outside of the partition wall, adhesiveness of the first substrate to the second substrate can be improved.

Also, in an aspect of the present invention, the partition wall is formed by using an organic insulating material. As the organic insulating material, acrylic (including photosensitive acrylic), polyimide (including photosensitive polyimide), siloxane and the like can be used.

In a case where the partition wall and the above pillar spacer are formed over the same substrate, the partition wall and the pillar spacer are formed by using the same material concurrently.

According to the liquid crystal display device of the present invention constituted as described above, a sealing portion and the conductive portion can be prevented from being in contact with each other when the first and second substrates are attached to each other. Thus, conductivity can be surely obtained in the conductive portion; therefore quality improvement of the liquid crystal display device can be achieved. In addition, by surrounding the conductor with the partition wall, the liquid crystal is not in contact with the conductor at the time of one drop filling (ODF) and solvent included in the conductor can be prevented from being mixed in the liquid crystal. Therefore, an impurity is not mixed in the liquid crystal, and the retention of the voltage can be prevented from decreasing.

The present invention can be used for both an active matrix substrate side and a counter substrate side.

In addition, the present invention can be used for any liquid crystal modes as long as it is a liquid crystal mode in which a conductive portion is provided between upper and lower substrates. Further, the present invention can be used regardless of a kind of a liquid crystal display such as a transmissive type, a reflective type and a semi-transmissive type.

DETAILED DESCRIPTION OF THE INVENTION

Hereinafter, embodiment modes of the present invention will be described based on the accompanying drawings. However, the present invention can be carried out in many different modes, and it is easily understood by those skilled in the art that modes and details herein disclosed can be modified in various ways without departing from the spirit and the scope of the present invention. Therefore, the present invention is not limited to the description of the embodiment modes to be given below. Note that in all drawings for describing the embodiment modes, the same reference numerals are used for the same portions or the portions having similar functions, and the repeated description thereof is omitted.

Embodiment Mode 1

Here, a liquid crystal display device will be described with reference to FIGS. 1A and 1B, FIG. 2, FIG. 3A to 3H and FIG. 4.

Figure 1A:
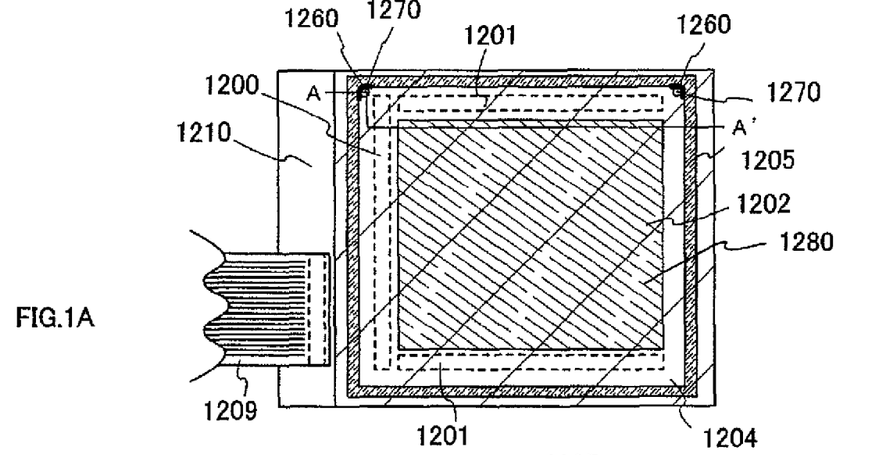
FIGS. 1A and 1B are views showing structures of a liquid crystal display device according to the present invention.

FIG. 1A shows an overall view of a liquid crystal display device of the present invention. A first substrate 1210 which serves as an active matrix substrate over which a pixel electrode is formed and a second substrate 1204 over which a counter substrate is formed are attached to each other with a sealant 1205, and an interior portion of the sealants 1205 is filled with a liquid crystal 1280. A signal line driver circuit 1200, a scanning line driver circuit 1201, and a pixel region 1202 in which pixel electrodes are formed in a matrix form are formed over the first substrate 1210.

A partition wall 1260 is provided between a conductor 1270 which generates conductivity between the first substrate 1210 and the second substrate 1204, and the sealant 1205. An FPC 1209 is attached to the first substrate 1210.

Figure 1B:
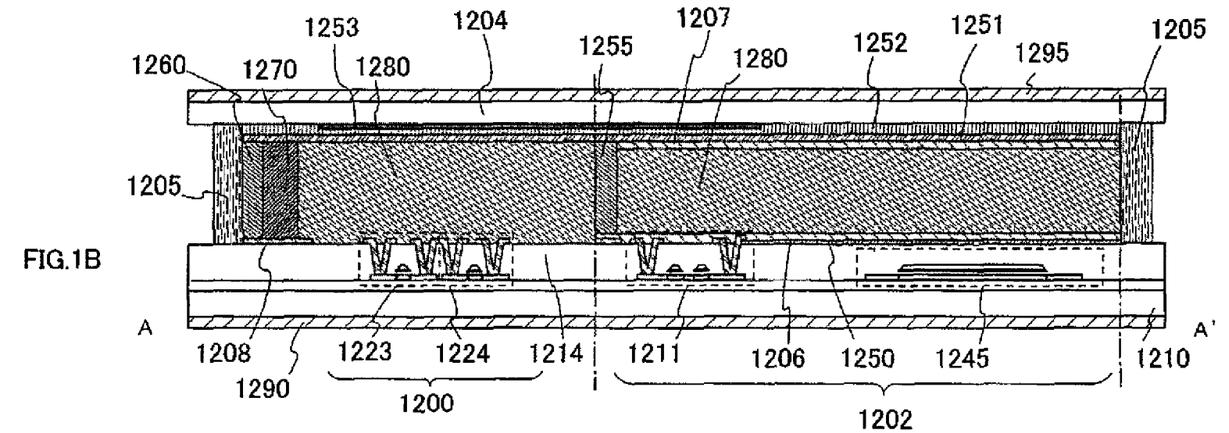
Figure 2:
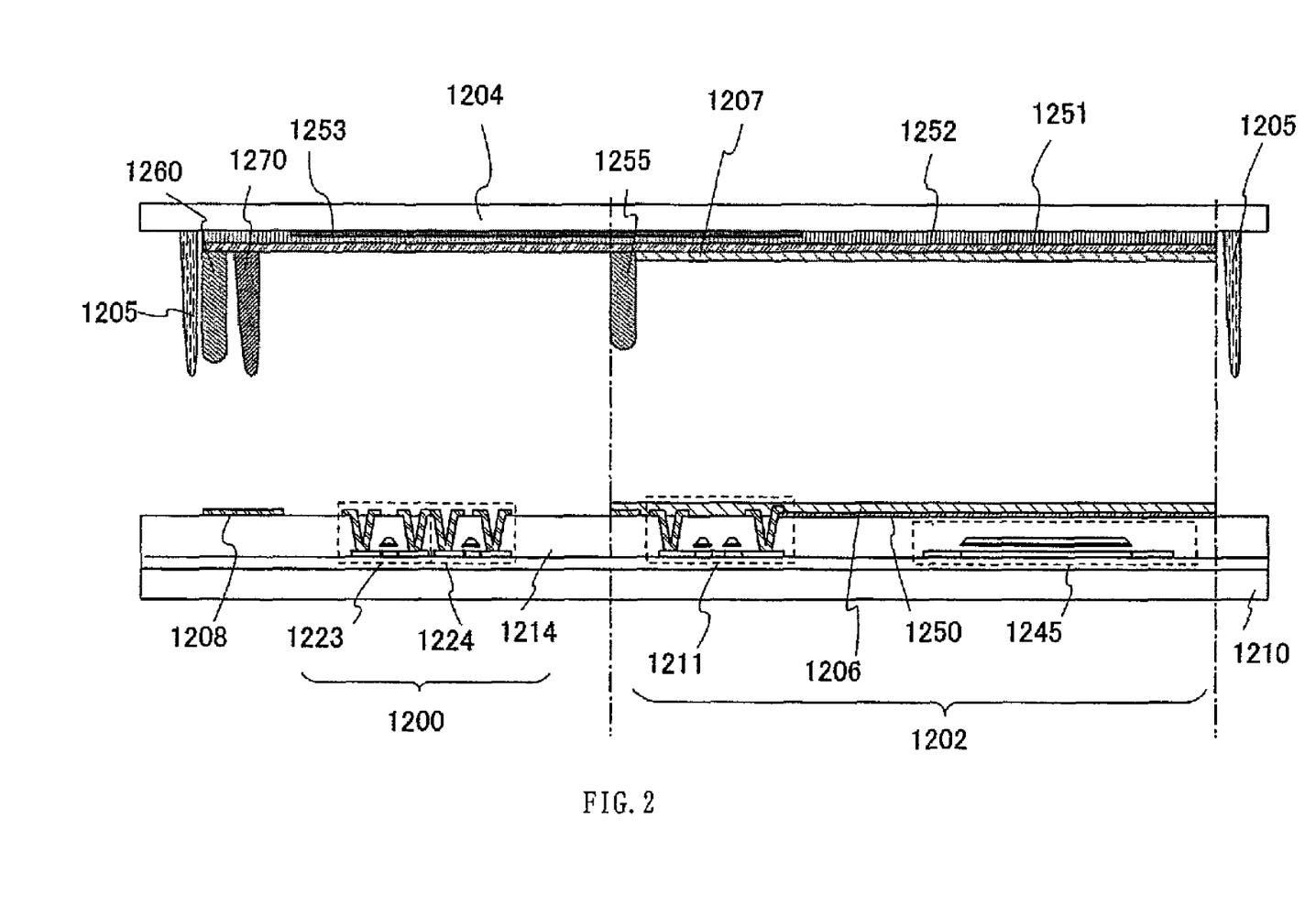
FIG. 2 is a view showing a structure of a liquid crystal display device according to the present invention.

FIG. 1B shows a cross-sectional view along a line A-A' of FIG. 1A. In addition, FIG. 2 shows a state before the first substrate 1210 and the second substrate 1204 are attached to each other. The signal line driver circuit 1200 provided with a CMOS circuit having an n-channel TFT 1223 and a p-channel TFT 1224 which is formed over the first substrate 1210, is shown. The n-channel TFT 1223 and the p-channel TFT 1224 are preferably formed by laser annealing using pulsed laser so as to have a crystalline semiconductor film in which crystal grains are aligned. It is more preferable to form a channel formation region from one crystal grain. A TFT forming the signal line driver circuit 1200 or the scanning line driver circuit 1201 shown in FIG. 1A may be formed by using a CMOS circuit, a PMOS circuit or an NMOS circuit.

The pixel region 1202 has a switching TFT 1211 and a capacitor element 1245. The pixel region is preferably formed by laser annealing of the switching TFT 1211 by using pulsed laser so as to have a crystalline semiconductor film in which crystal grains are aligned. More preferably, a channel formation region is formed from one crystal grain.

Note that a top gate TFT is used as an example in FIGS. 1A and 1B; however, the present invention can be applied regardless of a TFT structure. For example, the present invention can be applied to a bottom gate (inversely staggered) TFT or a staggered TFT. In addition, the present invention is not limited to a TFT of a single gate structure, and a multigate type TFT having a plurality of channel formation regions, for example, a double gate TFT, may also be used. Also, a pixel portion may be formed by using a TFT (a-SiTFT) which uses an amorphous silicon film.

The capacitor element 1245 is formed by a semiconductor film, a gate electrode and a gate insulating film interposed between the gate electrodes. It is not necessary that the TFT in the pixel region 1202 has high crystallinity as compared with the signal line driver circuit 1200 or the scanning line driver circuit 1201. An insulator 1214 is provided so as to cover the n-channel TFT 1223, the p-channel TFT 1224, the switching TFT 1211, and the capacitor element 1245. Over the insulator 1214, a pixel electrode 1250 connected to one of the electrodes of the switching TFT 1211 is provided, and a connection wiring 1208 to connect to an FPC 1209 is provided. There is a case where the connection wiring 1208 and the insulator 1214 are stacked in layers depending on an active matrix structure.

A type of a pixel electrode is different between a transmissive type display device and a reflective type display device. In the case of the transmissive type display device, the pixel electrode 1250 is formed by using a material having a light-transmitting property. As the material having the light-transmitting property, indium tin oxide (ITO), zinc oxide (ZnO), indium zinc oxide (IZO), zinc oxide doped with gallium (GZO) and the like are given.

On the other hand, in the case of the reflective type display device, a metal electrode having high reflectivity is used for the pixel electrode. Specifically, aluminum, silver and the like are used. In a case where concavity and convexity are required to be formed on the surface, quality of a base may have a structure having concavity and convexity, and a material to which an oxidization treatment is performed, such as alumina and titanium oxide may also be used.

In addition, in a case of a semi-transmissive type display device, a transmissive material and a reflective material are used for the pixel electrode.

An alignment film 1206 is provided over the pixel electrode and a rubbing treatment is performed. The alignment film 1206 and the rubbing treatment are necessary or unnecessary depending on a mode of a liquid crystal to be used.

A black matrix 1253 is provided at a position overlapping with the signal line driver circuit 1200 at the second substrate 1204 which serves as the counter substrate. A color filter and a protective film 1252 are provided at a position overlapping with at least the pixel region 1202. In a case where color display is performed by a color sequential method called field sequential, the color filter is not provided.

The second substrate 1204 over which the counter electrode 1251 is formed is provided with a pillar spacer 1255. The pillar spacer 1255 is provided to keep a gap between the first substrate 1210 and the second substrate 1204. The pillar spacer is called a photolitho spacer, a post spacer, a scallop spacer, or a column spacer; however, in this embodiment mode, it is referred to as a pillar spacer. As for a method for manufacturing the pillar spacer 1255, an organic insulating material such as a photosensitive acrylic is applied to an entire surface of the substrate by a spin coating method, a series of photolithography steps is performed, and then the photosensitive acrylic which remains on the substrate serves as a spacer. With this method, a place for disposing a spacer can be exposed depending on a mask pattern at the time of exposure; therefore, by disposing the pillar spacer at a portion where the liquid crystal does not drive, light of the liquid crystal can be prevented from leaking as well as maintaining a gap between the upper and lower substrates.

At the same time as forming the pillar spacer 1255, the partition wall 1260 is provided between the conductor 1270 and the sealant 1205. Therefore, in a case where the pillar spacer 1255 is provided over the first substrate 1210, the partition wall is also provided over the first substrate 1210. In addition, the partition wall 1260 may be manufactured in a step except for forming the pillar spacer 1255. In a case of a VA mode, a structural matter called rib is formed. At the same time as forming the rib, the partition wall 1260 may be formed.

Figure 3A:
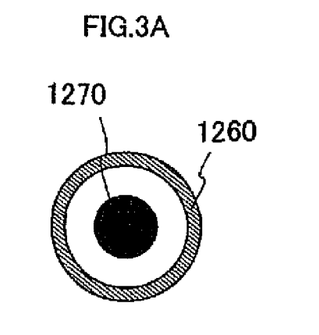
FIGS. 3A to 3H are views showing shapes of a partition wall of a liquid crystal display device according to the present invention.
Figure 3B:
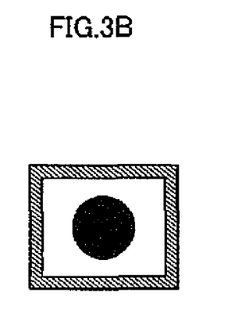
Figure 3C:
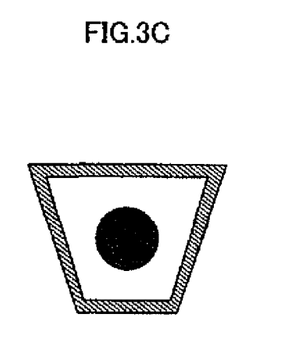
Figure 3D:
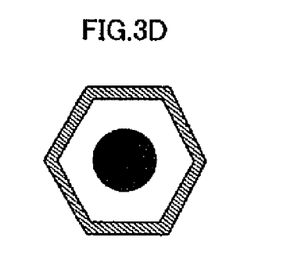
Figure 3E:
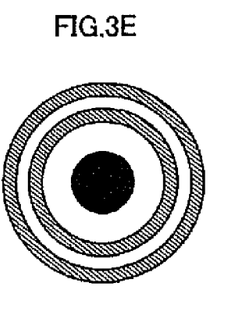
Figure 3F:
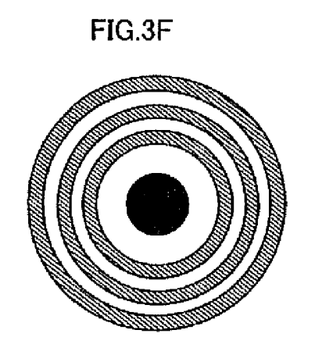
Figure 3G:
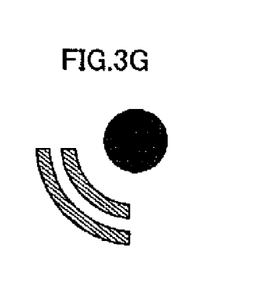
Figure 3H:
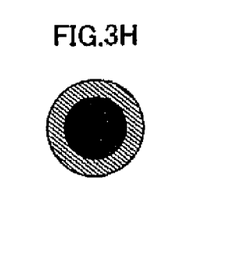

As a shape of the partition wall 1260, the partition wall 1260 may be formed between the sealant 1205 and the conductor 1270; therefore, the conductor 1270 may be surrounded by the partition wall 1260 as shown in FIGS. 3A to 3H. In other words, the conductor 1270 may be surrounded by a circular form as shown in FIG. 3A, by a quadrangular form as shown in FIG. 3B, by a trapezoidal form as shown in FIG. 3C, by a hexagonal form as shown in FIG. 3D, by a double circle as shown in FIG. 3E, and by a triple circle as shown in FIG. 3F. In addition, a structure may also be used, in which the conductor 1270 is not completely surrounded, but the sealant 1205 and the conductor 1270 are shielded by a partial double circle as shown in FIG. 3G. Also, the area can be made small by forming no space between the conductor 1270 and the partition wall 1260, as shown in FIG. 3H. The shape of the partition wall 1260 in the cross-sectional view is a quadrangle in FIG. 1B and FIG. 2; however, the shape may also be a trapezoid or a quadrangle having rounded apexes.

In a case where the partition wall 1260 is formed over the same substrate as the above-described pillar spacer 1255, the partition wall 1260 can be formed by using the same material as the pillar spacer 1255 concurrently, which is more preferable.

Note that by forming the partition wall 1260 between the sealant 1205 and the conductor 1270, a defect in conduction can be prevented, which is occurred by covering the conductor 1270 with the sealant 1205 when the first substrate 1210 and the second substrate 1204 are attached to each other with the sealant 1205. This makes it possible to give desired potential difference between the pixel electrode 1250 formed over the first substrate 1210 and the counter electrode 1251 formed over the second substrate 1204; therefore excellent display performance can be obtained.

Figure 4:
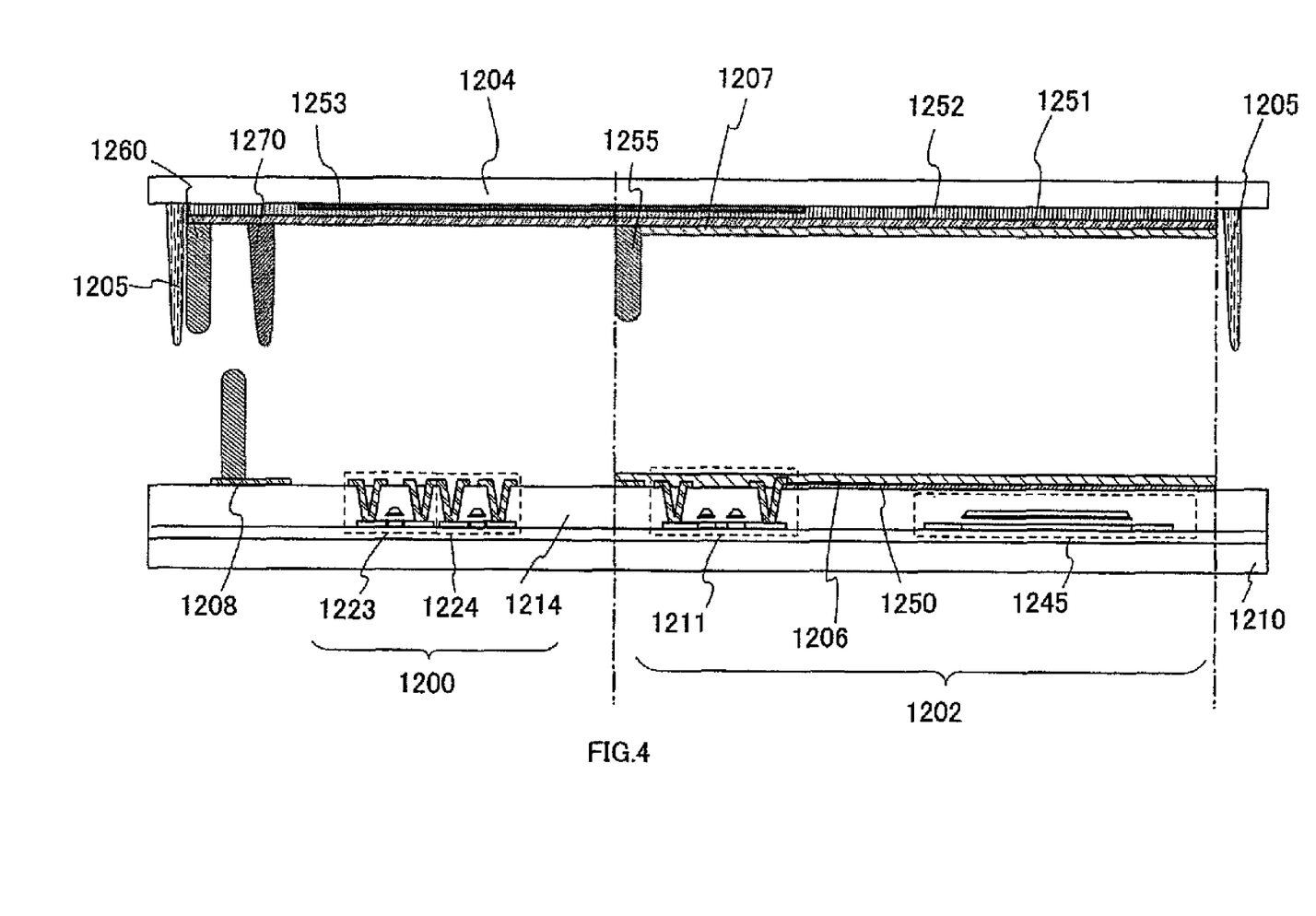
FIG. 4 is a view showing a structure of a liquid crystal display device according to the present invention.

In a case where the pillar spacer 1255 in the pixel region 1202 is higher than the conductive portion, there is a concern that the sealant 1205 goes over the partition wall 1260 when the first substrate 1210 and the second substrate 1204 are attached to each other, and thus, the partition wall 1260 may be provided over both the first substrate 1210 and the second substrate 1204 as shown in FIG. 4. However, in this case, the number of steps for a substrate over which a pillar spacer 1255 is not formed (in this embodiment mode, the first substrate 1210) is increased.

Then, an alignment film 1207 is provided, and a rubbing treatment is performed. As for the second substrate 1204, similarly to the first substrate 1210, the alignment film and the rubbing treatment are necessary or unnecessary depending on a mode of a liquid crystal to be used.

The sealant 1205 and the conductor 1270 are applied to the second substrate 1204. As an application method, a droplet discharging method, an ink jetting method, a spin coating method, a roll coating method, a slot coating method, a dipping method, and the like may be used. In FIG. 2, the sealant 1205 and the conductor 1270 are provided over the second substrate 1204; however, they may also be provided over the first substrate 1210. An epoxy resin material or the like is used for the sealant 1205, and the sealant 1205 shows an insulating property. On the other hand, as for the conductor 1270, a conductive material such as Au is added to the sealant which is used for the sealing portion. Moreover, the conductor 1270 generates conduction between the connection wiring 1208 formed over the first substrate 1210 and the counter electrode 1251 formed over the second substrate 1204.

Then, the first substrate 1210 and the second substrate 1204 are attached to each other as shown in FIG. 1B. A shape to which the sealant 1205 is applied varies depending on an injecting method of the liquid crystal 1280. In a general vacuum injecting method, the sealant 1205 has a shape in which one hole is opened, but in a case of a one drop filling method, a loop shape in which a hole is closed as shown in FIG. 1A is necessary.

The liquid crystal 1280 is injected between the first substrate 1210 and the second substrate 1204. The injection of the liquid crystal 1280 is generally performed in vacuum. In a case where the injection is not performed in vacuum, two or more openings are formed in the sealant, and the liquid crystal is injected using the capillary phenomenon. In addition, in a case of injecting the liquid crystal by a one drop filling method, the liquid crystal 1280 is dropped to the first substrate 1210 or the second substrate 1204, before the first substrate 1210 and the second substrate 1204 are attached to each other, and they are attached to each other in vacuum.

Then, the first substrate 1210 and the second substrate 1204 are separated into panel shapes. In a case where an opening is formed in the sealant at this point, the opening is sealed with a sealing material. Furthermore, in order to enhance contrast, a first polarizing plate 1290 is provided outside the first substrate 1210, and a second polarizing plate 1295 is provided outside the second substrate 1204. Note that there is a case where the first polarizing plate 1290 is unnecessary for a reflective type display device.

As described above, a structure, in which a defect in conduction due to the sealant is prevented can be obtained without increasing the number of steps in the conventional manufacturing process of a liquid crystal display device; therefore, quality of a liquid crystal display device can be improved. Further, a liquid crystal mode of the liquid crystal display device in this embodiment mode corresponds to all the liquid crystal modes in which the conductor 1270 is provided between the upper and lower substrates, in a liquid crystal display device adopting an active matrix driving, and a liquid crystal display device with a wide application range can be provided.

Embodiment Mode 2

The liquid crystal display device manufactured by implementing the above Embodiment Mode 1 can be used for various electronic devices. In other words, such a liquid crystal display device can be incorporated into display portions of electronic devices to be described below.

As such electronic devices, a television set, a video camera, a digital camera, a projector, a head mounted display (a goggle type display), a car navigation system, a car stereo, a personal computer, a portable information terminal (a mobile computer, a cellular phone, an electronic book, etc.) and the like can be given. Examples thereof are shown in FIGS. 5A to 5E and FIG. 6.

Figures 5A, 5B, 5C, 5D, 5E:
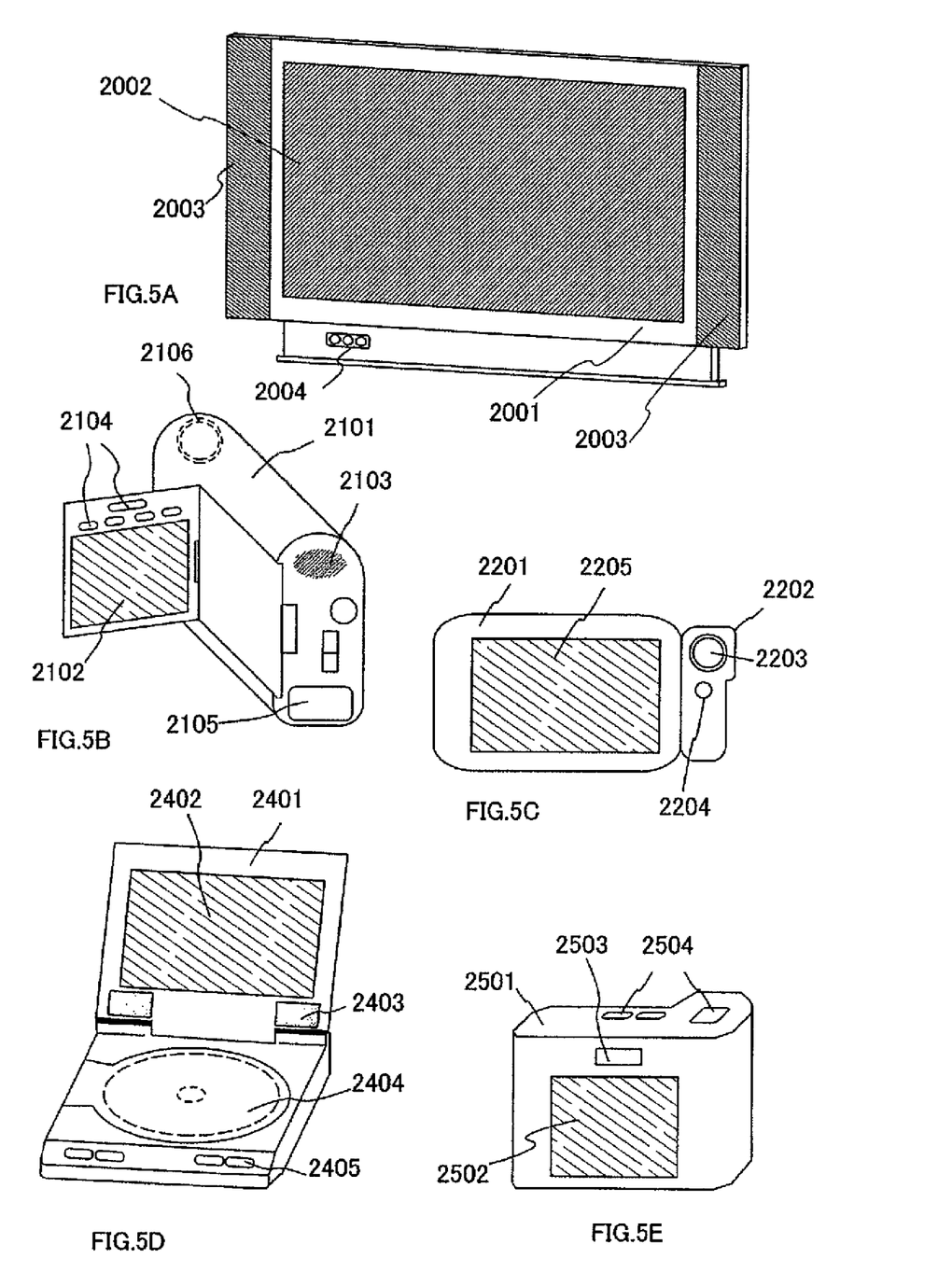
FIGS. 5A to 5E are views showing examples of an electronic device.

FIG. 5A is a television set which can be completed by incorporating the liquid crystal display device shown in Embodiment Mode 1 into a chassis 2001. A display screen 2002 is formed by the liquid crystal display device of the present invention. In addition, a speaker 2003, operation switches 2004, and the like are appropriately provided.

By being constituted including the liquid crystal display device of the present invention, defects in electrical connection in a conductive portion which electrically connects a pixel electrode to a counter electrode, is improved; therefore, a television set having superior display performance to the conventional one can be provided.

FIG. 5B is a video camera, which includes a main body 2101, a display portion 2102, a voice input portion 2103, operation switches 2104, a battery 2105, an image receiving portion 2106 and the like. Note that the display portion 2102 is formed by the liquid crystal display device of the present invention.

By being constituted including the liquid crystal display device of the present invention, defects in electrical connection in a conductive portion which electrically connects a pixel electrode to a counter electrode, is improved; therefore, a video camera having superior display performance to the conventional one can be provided.

FIG. 5C is a mobile computer, which includes a main body 2201, a camera portion 2202, an image receiving portion 2203, an operation switch 2204, a display portion 2205 and the like. Note that the display portion 2205 is formed by the liquid crystal display device of the present invention.

By being constituted including the liquid crystal display device of the present invention, defects in electrical connection in a conductive portion which electrically connects a pixel electrode to a counter electrode, is improved; therefore, a mobile computer having superior display performance to the conventional one can be provided.

FIG. 5D is player using a recording medium (hereinafter, referred to as a recording medium) which records a program, which includes a main body 2401, a display portion 2402, a speaker portion 2403, a recording medium 2404, operation switches 2405 and the like. The player makes it possible to appreciate music and films, play games, and connect to the Internet by using a DVD, a CD and the like as a recording medium. Note that the display portion 2402 is formed by the liquid crystal display device of the present invention.

By being constituted including the liquid crystal display device of the present invention, defects in electrical connection in a conductive portion which electrically connects a pixel electrode to a counter electrode, is improved; therefore, a recording medium having superior display performance to the conventional one can be provided.

FIG. 5E is a digital camera, which includes a main body 2501, a display portion 2502, an eye piece portion 2503, operation switches 2504, an image receiving portion (not illustrated) and the like. Note that the display portion 2502 is formed by the liquid crystal display device of the present invention.

By being constituted including the liquid crystal display device of the present invention, defects in electrical connection in a conductive portion which electrically connects a pixel electrode to a counter electrode is improved; therefore, a digital camera having superior display performance to the conventional one can be provided.

Figure 6:
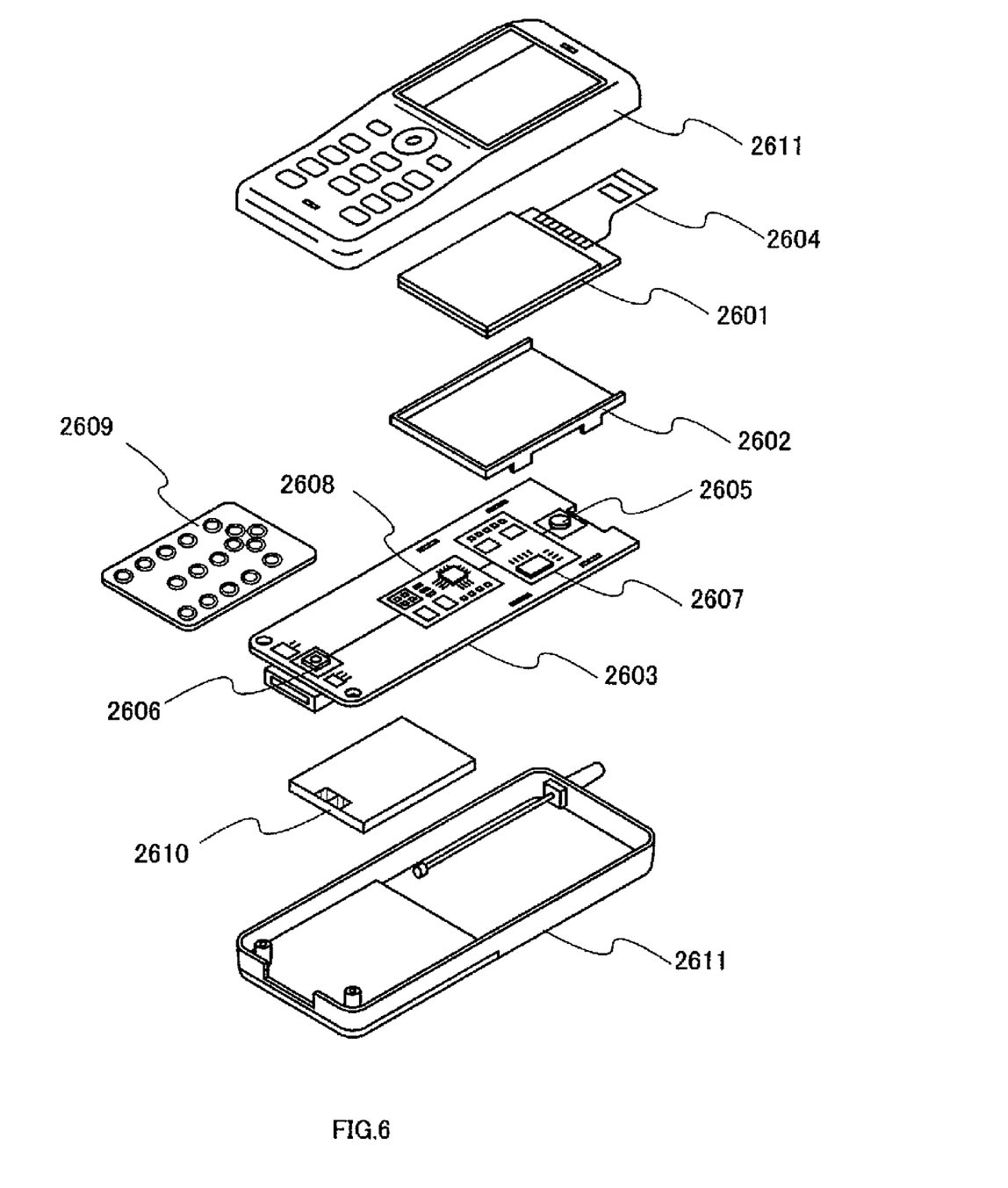
FIG. 6 is a view showing one example of an electronic device.

FIG. 6 shows one mode of a cellular phone including the liquid crystal display device of the present invention. A liquid crystal display device 2601 is incorporated to a housing 2602 to be detachable. As for the housing 2602, the shape or size can be appropriately changed in accordance with the size of the liquid crystal display device 2601. The housing 2602 in which the liquid crystal display device 2601 is fixed is incorporated to a print substrate 2603, and a module is built.

The liquid crystal display device 2601 is connected to the print substrate 2603 through an FPC 2604. A speaker 2605, a microphone 2606, a transmission/reception circuit 2607 and a signal processing circuit 2608 including a CPU, a controller and the like are formed over the print substrate 2603. Such a module, and an input means 2609 and a battery 2610 are combined and put in a chassis 2611. A pixel portion of the liquid crystal display device 2601 is disposed so as to be recognized from an aperture formed in the chassis 2611.

By being constituted including the liquid crystal display device of the present invention, defects in electrical connection in a conductive portion which electrically connects a pixel electrode to a counter electrode, is improved; therefore, a cellular phone having superior display performance to the conventional one can be provided.

A cellular phone in accordance with this embodiment mode can be changed into various modes depending on a function and application thereof. For example, the above advantageous effect can be achieved even for a structure in which a plurality of liquid crystal display devices are provided, or a structure in which the chassis is appropriately divided into several pieces and are opened or closed with a hinge.

As described above, the present invention has an extremely wide application range, and can be applied to electronic devices in various fields.

What is claimed is:

1. A liquid crystal display device comprising:
   a liquid crystal material interposed between a first substrate and a second substrate,
   a pixel electrode formed over the first substrate;
   a connection wiring formed over the first substrate; and
   a counter electrode formed over the second substrate,
   wherein the first substrate and the second substrate are positioned so that the pixel electrode and the counter electrode are provided between the first substrate and the second substrate, and the first substrate and the second substrate are attached to each other with a sealant provided around the first substrate and the second substrate,
   the liquid crystal display device further comprising:
   a conductor electrically connecting the connection wiring to the counter electrode,
   wherein the conductor is surrounded by a partition wall, and is provided on an inside of the sealant,
   wherein the partition wall is provided between the conductor and the liquid crystal material, and
   wherein there is a space between the partition wall and the conductor, and pressure in the space is reduced.

2. A device according to claim 1, wherein a plurality of the partition walls formed over the first substrate or the second substrate, are provided between the sealant and the conductor.

3. A device according to claim 1, wherein the partition wall comprises a material selected from the group consisting of acrylic, polyimide and siloxane.

4. A device according to claim 1, wherein the sealant comprises an epoxy resin material.

5. A liquid crystal display device comprising:
   a liquid crystal material interposed between a first substrate and a second substrate;
   a pixel electrode formed over the first substrate;
   a driver circuit formed over the first substrate;
   a connection wiring formed over the first substrate;
   a conductor formed over the first substrate;
   a partition wall formed over the first substrate;
   a counter electrode formed over the second substrate;
   a color filter formed over the second substrate; and
   a pillar spacer formed over the second substrate,
   wherein the first substrate and the second substrate are positioned so that the pixel electrode and the counter electrode are provided between the first substrate and the second substrate, and the first substrate and the second substrate are attached to each other with a sealant provided around the first substrate and the second substrate;
   wherein the conductor electrically connects the connection wiring to the counter electrode, is surrounded by the partition wall, and provided on an inside of the sealant,
   wherein the partition wall is provided between the conductor and the liquid crystal material, and
   wherein there is a space between the partition wall and the conductor, and pressure in the space is reduced.

6. A device according to claim 5, wherein a plurality of the partition walls formed over the first substrate or the second substrate, are provided between the sealant and the conductor.

7. A device according to claim 5, wherein the partition wall and the pillar spacer are formed with a same organic insulating material.

8. A device according to claim 5, wherein the partition wall comprises a material selected from the group consisting of acrylic, polyimide and siloxane.

9. A device according to claim 5, wherein the sealant comprises an epoxy resin material.

10. A liquid crystal display device comprising:
    a liquid crystal material interposed between a first substrate and a second substrate;
    a pixel electrode formed over the first substrate;
    a driver circuit formed over the first substrate;
    a connection wiring formed over the first substrate;
    a conductor formed over the first substrate;
    a first partition wall formed over the first substrate;
    a counter electrode formed over the second substrate;
    a color filter formed over the second substrate;
    a pillar spacer formed over the second substrate; and
    a second partition wall formed over the second substrate,
    wherein the first substrate and the second substrate are positioned so that the pixel electrode and the counter electrode are provided between the first substrate and the second substrate, and the first substrate and the second substrate are attached to each other with a sealant provided around the first substrate and the second substrate;
    wherein the conductor electrically connects the connection wiring to the counter electrode, is surrounded by the first and second partition walls, and provided on an inside of the sealant,
    wherein the first and second partition walls are provided between the conductor and the liquid crystal material, and
    wherein there is a space between at least one of the first partition wall and the second partition wall and the conductor, and pressure in the space is reduced.

11. A device according to claim 10, wherein a plurality of the partition walls formed over the first substrate or the second substrate, are provided between the sealant and the conductor.

12. A device according to claim 10, wherein the first partition wall and the second partition wall comprise a material selected from the group consisting of acrylic, polyimide and siloxane.

13. A device according to claim 10, wherein the sealant comprises an epoxy resin material.

14. A liquid crystal display device comprising:
    a liquid crystal material interposed between a first substrate and a second substrate;
    a pixel electrode formed over the first substrate;
    a connection wiring formed over the first substrate; and
    a counter electrode formed over the second substrate,
    wherein the first substrate and the second substrate are positioned so that the pixel electrode and the counter electrode are provided between the first substrate and the second substrate, and the first substrate and the second substrate are attached to each other with a sealant provided around the first substrate and the second substrate,
    the liquid crystal display device further comprising:
    a conductor electrically connecting the connection wiring to the counter electrode and provided on an inside of the sealant; and
    a partition wall,
    wherein the partition wall is provided between the conductor and the liquid crystal material, and
    wherein there is a space between the partition wall and the conductor, and pressure in the space is reduced.

15. A device according to claim 14, wherein the partition wall is in contact with the conductor.

16. A device according to claim 14, wherein a plurality of the partition walls formed over the first substrate or the second substrate, are provided between the sealant and the conductor.

17. A device according to claim 14, wherein the partition wall comprises an organic insulating material.

18. A device according to claim 14, wherein the partition wall comprises a material selected from the group consisting of acrylic, polyimide and siloxane.

19. A device according to claim 14, wherein the sealant comprises an epoxy resin material.

20. A liquid crystal display device comprising:
a liquid crystal material interposed between a first substrate and a second substrate;
a pixel electrode formed over the first substrate;
a driver circuit formed over the first substrate;
a connection wiring formed over the first substrate;
a conductor formed over the first substrate;
a counter electrode formed over the second substrate;
a color filter formed over the second substrate;
a partition wall formed over the second substrate; and
a pillar spacer formed over the second substrate,
wherein the first substrate and the second substrate are positioned so that the pixel electrode and the counter electrode are provided between the first substrate and the second substrate, and the first substrate and the second substrate are attached to each other with a sealant provided around the first substrate and the second substrate;
wherein the conductor electrically connects the connection wiring to the counter electrode, is surrounded by the partition wall, and provided on an inside of the sealant,
wherein the partition wall is formed at the same time as the pillar spacer, and is provided between the conductor and the liquid crystal material, and
wherein there is a space between the partition wall and the conductor, and pressure in the space is reduced.

21. A device according to claim 20, wherein the partition wall is in contact with the conductor.

22. A device according to claim 20, wherein a plurality of the partition walls formed over the first substrate or the second substrate, are provided between the sealant and the conductor.

23. A device according to claim 20, wherein the partition wall and the pillar spacer are formed with a same organic insulating material.

24. A device according to claim 20, wherein the partition wall comprises a material selected from the group consisting of acrylic, polyimide and siloxane.

25. A device according to claim 20, wherein the sealant comprises an epoxy resin material.

26. A liquid crystal display device comprising:
a liquid crystal material interposed between a first substrate and a second substrate;
a pixel electrode formed over the first substrate;
a driver circuit formed over the first substrate;
a connection wiring formed over the first substrate;
a conductor formed over the first substrate;
a partition wall formed over the first substrate;
a counter electrode formed over the second substrate;
a color filter formed over the second substrate; and
a pillar spacer formed over the second substrate,
wherein the first substrate and the second substrate are positioned so that the pixel electrode and the counter electrode are provided between the first substrate and the second substrate, and the first substrate and the second substrate are attached to each other with a sealant provided around the first substrate and the second substrate;
wherein the conductor electrically connects the connection wiring to the counter electrode, is surrounded by the partition wall, and provided on an inside of the sealant,
wherein the partition wall is placed around the conductor, and is provided between a conductor and the liquid crystal material, and
wherein there is a space between the partition wall and the conductor, and pressure in the space is reduced.

27. A device according to claim 26, wherein the partition wall is in contact with the conductor.

28. A device according to claim 26, wherein a plurality of the partition walls formed over the first substrate or the second substrate, are provided between the sealant and the conductor.

29. A device according to claim 26, wherein the partition wall and the pillar spacer are formed with a same organic insulating material.

30. A device according to claim 26, wherein the partition wall comprises a material selected from the group consisting of acrylic, polyimide and siloxane.

31. A device according to claim 26, wherein the sealant comprises an epoxy resin material.

32. A liquid crystal display device comprising:
a liquid crystal material interposed between a first substrate and a second substrate;
a pixel electrode formed over the first substrate;
a driver circuit formed over the first substrate;
a connection wiring formed over the first substrate;
a conductor formed over the first substrate;
a first partition wall formed over the first substrate;
a counter electrode formed over the second substrate;
a color filter formed over the second substrate;
a pillar spacer formed over the second substrate; and
a second partition wall formed over the second substrate,
wherein the first substrate and the second substrate are positioned so that the pixel electrode and the counter electrode are provided between the first substrate and the second substrate, and the first substrate and the second substrate are attached to each other with a sealant provided around the first substrate and the second substrate;
wherein the conductor electrically connects the connection wiring to the counter electrode, is surrounded by the first and second partition walls, and provided on an inside of the sealant,
wherein the first and second partition walls are positioned around the conductor and are provided between the conductor and the liquid crystal material, and
wherein there is a space between at least one of the first partition wall and the second partition wall and the conductor, and pressure in the space is reduced.

33. A device according to claim 32, wherein a plurality of the partition walls formed over the first substrate or the second substrate, are provided between the sealant and the conductor.

34. A device according to claim 32, wherein the first partition wall and the second partition wall comprise a material selected from the group consisting of acrylic, polyimide and siloxane.

35. A device according to claim 32, wherein the sealant comprises an epoxy resin material.

* * * * *